United States Patent [19]

Bartholomew

[11] 4,368,926
[45] Jan. 18, 1983

[54] BRAKE PROPORTIONING SYSTEM

[75] Inventor: Roy E. Bartholomew, Elyria, Ohio

[73] Assignee: The Bendix Corporation, Southfield, Mich.

[21] Appl. No.: 191,600

[22] Filed: Sep. 29, 1980

[51] Int. Cl.³ .............................................. B60T 13/00
[52] U.S. Cl. ...................................... 303/7; 303/6 C; 303/13
[58] Field of Search ................... 303/6 C, 7, 9, 13, 22, 303/23, 6 R, 6 A, 6 M, 71, 50-56, 40, 35; 188/3 R, 349, 195

[56] References Cited

U.S. PATENT DOCUMENTS

| | | | |
|---|---|---|---|
| 3,190,700 | 6/1965 | Fites | 303/7 |
| 3,492,052 | 1/1970 | Klimek | 303/6 C |
| 3,957,315 | 5/1976 | Cummins et al. | 303/7 X |
| 4,230,373 | 10/1980 | Plantan | 303/7 |
| 4,261,624 | 4/1981 | Plantan | 303/7 |

*Primary Examiner*—Douglas C. Butler
*Attorney, Agent, or Firm*—Ken C. Decker; W. N. Antonis

[57] ABSTRACT

A fluid pressure braking system for an articulated vehicle having a towed unit and a towing unit includes a source of fluid pressure carried on the towing unit and a supply line (58) and a service line (62) which communicate the braking system on the towing unit with the braking system on the towed unit. A first proportioning valve (76) controls communication to the relay valve (84) which controls communication of braking pressure to the rear wheel service brakes on the towing unit. The proportioning valve (76) is controlled by an inversion valve (90) which is responsive to the pressure level in the supply line (58). When the pressure level in the supply line (58) is below a predetermined level indicating that the towing unit has been disconnected from the towed unit, the inversion valve (90) causes the proportioning valve (76) to proportion communication to the relay valve (84). A second proportioning valve (28) controls communication to the front wheel brakes of the towing unit and is responsive to the signal from the inversion valve (90) to proportion communication to the front wheel brakes when the towing unit is connected to the towed unit but which permits an uninhibited communication to the front wheel brakes when the towed unit is disconnected from the towing unit. A third proportioning valve (34) controls communication through the service line (62) and is responsive to an operator actuated control valve (68) to provide proportioned brake applications on the trailer service brakes when the trailer is lightly loaded. A synchronizing valve (40) is responsive to the magnitude of the brake application to reset the operator actuator valve (68) when higher pressures are generated, indicating that the towed and towing units have been recoupled.

9 Claims, 5 Drawing Figures

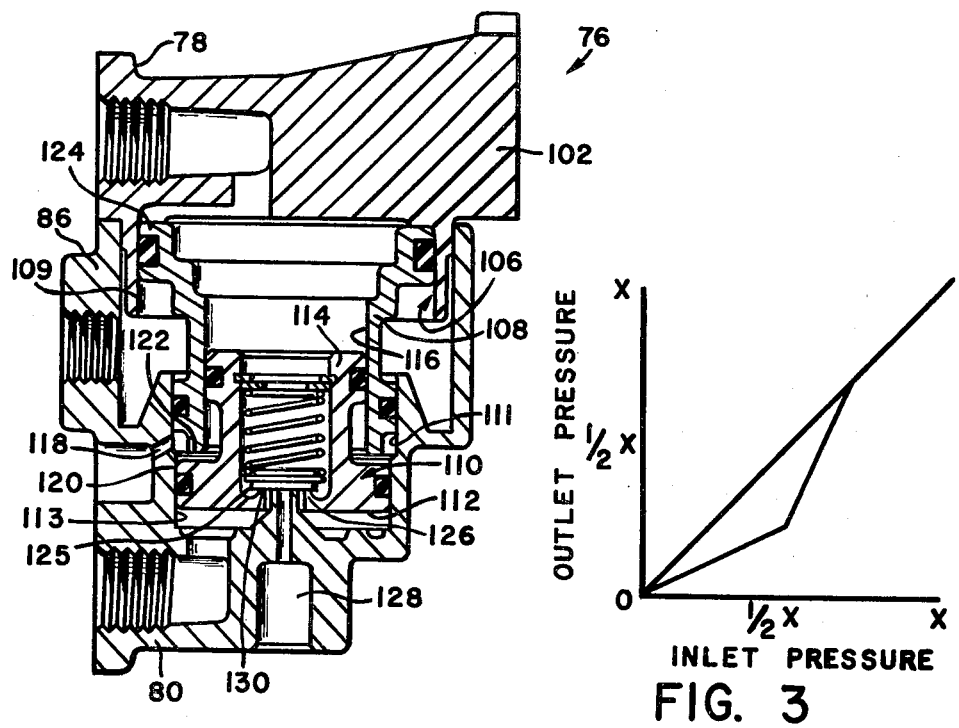
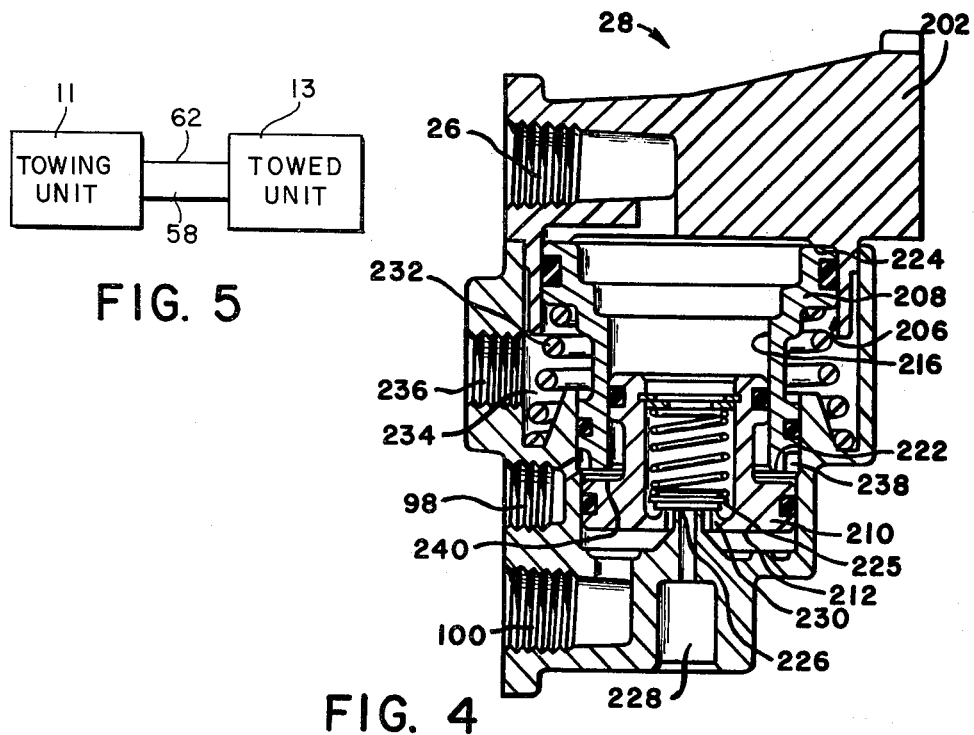

BRAKE PROPORTIONING SYSTEM

This invention relates to a fluid pressure braking system for tractor-trailer combination vehicles.

Fluid pressure braking systems are already known in which a source of fluid pressure is carried by the tractor and a supply line interconnects the tractor and trailer braking systems for communicating fluid pressure from the tractor to the trailer. The supply line is maintained at a predetermined pressure level by the fluid pressure source when the tractor and trailer are coupled together, but the supply line is vented when the tractor is disconnected from the trailer and the supply line is thereby disconnected from the braking system of the trailer. The tractor is also provided with conventional front and rear service brakes and an operator actuated service braking system for actuating the service brakes.

While braking systems of this type work quite well when the tractor pulls a fully ladened trailer, difficulties arise when the trailer is operated without the tractor and when the tractor pulls an unloaded or lightly loaded trailer. In these latter cases, the brakes of the vehicle are too effective, because the brakes must be sized to accommodate braking of a fully ladened trailer. Accordingly, the vehicle is susceptible to dangerous skidding during a brake application. Also, the balance between the brakes on the various axles of the vehicle changes when the loading is changed and when the tractor is disconnected.

According to the invention, the tractor service brake actuating system includes a proportioning valve having an inlet communicated to the pressure source when a brake application is effected and an outlet communicated to the front service brakes. The proportioning valve is communicated with the supply line, and is responsive to the pressure level in the supply line above a predetermined level to proportion fluid communication between the inlet and outlet of the proportioning valve, the proportioning valve being responsive to the pressure level of the supply line below the predetermined level to establish a pressure level at the outlet less than the pressure level communicated to the inlet of the proportioning valve.

According to another feature of the invention, the service braking actuating system includes a second proportioning valve having an outlet connected to the service brake line which communicates a brake actuation signal to the trailer braking system. The second proportioning valve also has an inlet communicating to the pressure source when the brake application is effected. The second proportioning valve is responsive to a pressure signal controlled by the vehicle operator to shift from a first condition in which the second proportioning valve proportions communication between the inlet and outlet thereof to establish a proportionally lower pressure level at the outlet than at the inlet to a second condition permitting substantially uninhibited communication through the proportioning valve. The mechanism which provides the pressure signal also includes a pressure responsive device which is responsive to the pressure level of the service brake actuating system to reset the second proportioning valve from the first condition to the second condition whenever the pressure level of the service brake actuating system exceeds a predetermined level.

This invention has the advantage of tailoring the effectiveness of the braking system to the load carried by the trailer. For example, in cases where the trailer is lightly loaded or is unloaded, the vehicle operator can reduce the effectiveness of the trailer brakes by manipulating a dash control valve. Furthermore, the system improves brake balance between the front and rear axle when the vehicle is operated without a trailer. In this condition, the front service brakes of the vehicle must perform a substantially higher proportion of the braking effort than is required when the tractor pulls a trailer. Accordingly, the present invention permits the front brakes to be more effective as compared to the rear wheel service brakes of the tractor when the tractor is operated without a trailer.

These and other advantages of the invention will be apparent in view of the following description, with reference to the accompanying drawings in which:

FIG. 2 is a longitudinal cross-sectional view of one of the proportioning valves used in the system of FIG. 1;

FIG. 3 is a graphical representation of the operation of valves used in the system of FIG. 1; and FIG. 4 is a longitudinal cross-sectional view of another proportioning valve used in the system illustrated in FIG. 1.

FIG. 5 is a diagramatic representation of a tractor-trailer vehicle.

Figure 1:
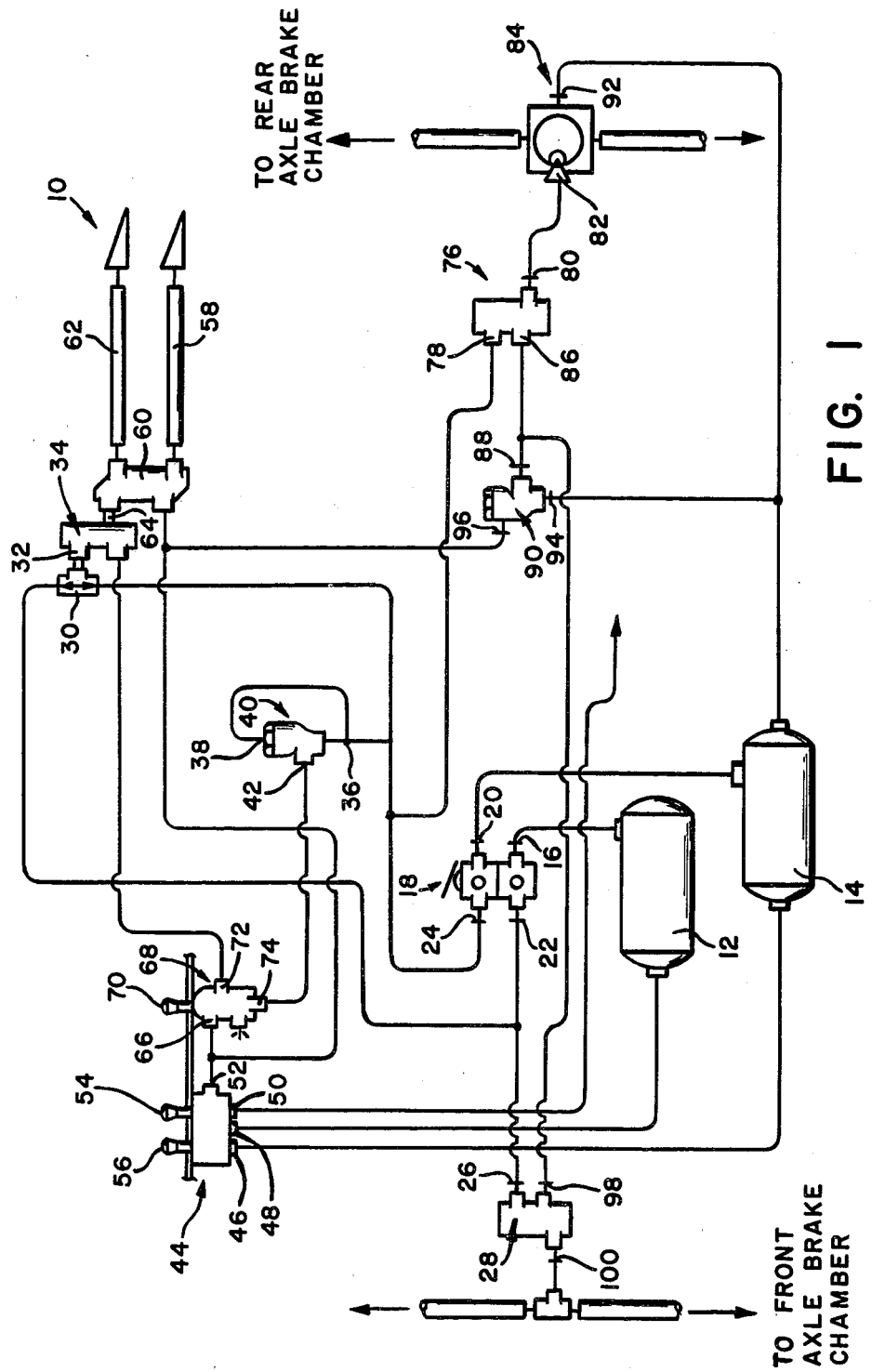
FIG. 1 is a schematic illustration of a braking system made pursuant to the teachings of my present invention in which conventional elements which do not affect the operation of the invention are omitted for clarity.

Referring now to the drawings, a braking system generally indicated by the numeral 10 carried on the towing unit 11 of a tractor-trailer combination vehicle consisting of the towing unit 11 and a towed unit 13 includes a front service reservoir 12 and a rear service reservoir 14. The reservoirs 12, 14 are charged with fluid pressure in the conventional manner by a conventional automotive air compressor (not shown). The front service reservoir 12 is communicated to one of the supply ports 16 of a conventional dual foot operated brake valve generally indicated by the numeral 18. The rear reservoir 14 is communicated to the other supply port 20 of the brake valve 18. When a brake application is effected, the vehicle operator operates the brake valve 18 which connects the supply port 16 with a delivery port 22 and the supply port 20 with a delivery port 24 to effect a brake application. The delivery port 22 is communicated to the supply port 26 of a front proportioning valve generally indicated by the numeral 28. The valve 28 will be described in detail hereinafter. The delivery port 22 is also connected through a double check valve 30 to the supply port 32 of a trailer proportioning valve generally indicated by the numeral 34, which will also be described in detail hereinafter. The delivery port 24 is communicated to a supply port 36 and control port 38 of a conventional synchronizing valve generally indicated by the numeral 40. The synchronizing valve 40 is responsive to the fluid pressure level at the supply and control ports 36, 38 to vent the delivery port 42 thereof when the pressure at the control port 38 is below a predetermined pressure level. At pressure levels above the predetermined pressure level, the synchronizing valve opens to close the vent and to communicate the delivery port 42 with the supply port 36.

The braking system 10 further includes a control vale assembly generally indicated by the numeral 44 which provides a pair of conventional control valves inside a common housing. The control valve assembly 44 is provided with supply ports 46, 48 and delivery ports 50, 52. Valve mechanism 44 is conventional, and is provided with separate actuators 54, 56. Operation of actuator 56 communicates the supply port 46 with the delivery port 50 and operation of the actuator 56 communicates the supply port 48 with the delivery port 52. Supply port 46 is communicated to the rear service reservoir 14 and the supply port 48 is communicated to the front service reservoir 12. Delivery port 50 is communicated to the rear parking brakes on the tractor. The rear parking brakes are of the spring-applied, fluid pressure released type so that the parking brakes are vented by moving the actuator 56 into the position shown in the drawing to thereby apply the parking brakes. When the vehicle is to be moved, the actuator 56 is pushed inwardly viewing the Figure, thereby communicating the supply port 46 with the delivery port 50 to communicate hold-off pressure to the spring brakes in the conventional manner. The delivery port 52 of valve assembly 44 is communicated to the trailer supply line 58 through a conventional tractor protection valve 60. The trailer service line 62 is communicated through the tractor protection valve 60 to the delivery port 64 of the trailer proportioning valve 34. The trailer supply line 58 communicates air pressure to the trailer to thereby charge the reservoirs on the trailer and the service line 62 communicates a brake actuating signal to the trailer service brake actuating system.

The delivery port 52 of valve assembly 44 is also communicated to a supply port 66 of a pushpull valve assembly generally indicated by the numeral 68. The valve assembly 68 is similar to the valve assemblies within the modular valve assembly 44 and includes a control knob 70 which is manipulated by the vehicle operator between positions communicating the supply port 66 with a delivery port 72 and a position closing off the supply port 66 and venting the delivery port 72. The valve assembly 68 differs from the valve assemblies within the modular control valve 44 in that the valve assembly 68 is responsive to a pressure signal at a control port 74 thereof to move automatically in response to the pressure signal to the position in which the supply port 66 is cut off from the delivery port 72 and the latter is vented. The control port 74 of valve 68 is communicated to the delivery port 42 of the valve 40. The delivery port 72 of valve 68 is communicated to the control port 33 of trailer proportioning valve 34.

Braking system 10 further includes a rear brake proportioning valve generally indicated by the numeral 76. Valve 76 is illustrated in FIG. 2 hereof and will be described in detail hereinafter. Valve 76 includes a supply port 78 which is communicated to the delivery port 24 of the brake valve 18, a delivery port 80 which is communicated to the control port 82 of the rear wheel service brake relay valve generally indicated by the numeral 84, and a control port 86 which is communicated to the delivery port 88 of an inversion valve generally indicated by the numeral 90. The relay valve 84 is conventional, and is responsive to a pressure signal at control port 82 to communicate fluid pressure from the supply port 92 to the rear wheel service brakes. Valve 76, as will be more completely described hereinafter, is responsive to a pressure signal at the control port 86 to proportion communication of fluid pressure between the supply port 78 and delivery port 80 to thereby establish a fluid pressure level at the delivery port 80 which is a predetermined amount less than the pressure at the delivery port 78 through a substantial proportion of the range of actuating pressures. Valve 76 is responsive to venting of the control port 86 to permit substantially uninhibited fluid communication between the supply port 78 and the delivery port 80.

The inversion valve 90 is conventional, and includes a supply port 94 which is communicated to the reservoir 14 and a control port 96 which is communicated to the delivery port 52 of the valve assembly 44 so that the pressure in supply line 58 is therefore communicated to the control port 96. As discussed above, the delivery port 88 is connected to the control port 86 of the proportioning valve 76. However, delivery port 88 of inversion valve 90 is also connected to the control port 98 of the front proportioning valve 28. The inversion valve 90 is responsive to the pressure signal at the control port 96 to cut off communication between the supply port 94 and delivery port 88 and to vent the delivery port 88 to atmosphere. When the pressure level at the control port 96 is vented, the inversion valve 90 closes the vent and communicates the supply port 94 with the delivery port 88.

The front proportioning valve 28 is responsive to a pressure signal from the inversion valve 90 at control port 98 to permit substantially uninhibited fluid communication from the supply port 26 to the delivery port 100 and therefore to the front wheel brakes of the tractor. When the control port 98 is vented, the proportioning valve 28 proportions fluid communication between the supply port 26 and the delivery port 100 to establish a pressure level at the delivery port 100 that is a predetermined amount less than the pressure level at the supply port 26 throughout a substantial proportion of the range of actuating pressures generated by the brake valve 18.

Referring now to FIG. 2, the construction and operation of the valve 76 will now be described in detail. Since the valves 76 and 34 are identical, only the valve 76 will be described. The proportioning valve generally indicated by the numeral 76 includes a housing 102 defining a stepped bore generally indicated by the numeral 106 therein. A larger piston 108 is slidably and sealingly mounted in the stepped portions 109, 111 of bore 106. A differential area piston 110 has a larger diameter end 112 slidably and sealingly engaged with the smaller diameter portion 113 of the bore 106. Piston 110 further includes a smaller diameter end 114 that is slidingly and sealingly received within a bore 116 defined within the piston 108. The differential area between the portions 112 and 114 of the piston 110 is vented through a vent 118 to atmosphere. A chamber 120 receives the smaller end 122 of the piston 108. The larger end 124 of the piston 108 and the smaller diameter end 114 of the piston 110 are exposed to the pressure level at the supply port 78. The larger diameter end 112 of the piston 110 is exposed to the fluid pressure level at the delivery port 80. The differential area piston 110 carries a spring loaded valve 125 which is urged into sealing engagement with a valve seat 126. Valve 125 is adapted to cooperate with the valve seat 126 to control communication between the supply port 78 and the delivery port 80 and with valve seat 130 to control communication between delivery port 80 and exhaust port 128.

In operation of valve 76, pressure at the supply port 78, assuming the control port 86 is vented, causes the larger piston 108 to move downwardly viewing FIG. 2 until the lower end 122 thereof engages the piston 100, thereby also forcing it downwardly viewing FIG. 2 to provide a relatively uninhibited flowpath between the supply port 78 and the delivery port 80 around the valve seat 126 of the piston 110. Accordingly, referring to FIG. 3, the rear axle proportioning valve 76 permits substantially uninhibited fluid communication between the supply port 78 and delivery port 80, as represented by line 0A in FIG. 3. In other words, the fluid pressure delivered to the rear service brakes is substantially the fluid pressure at the brake valve 18.

The pressure signal communicated to the control port 86 of the proportioning valve 76 when the inversion valve 90 opens is substantially full reservoir pressure. However, the pressure communicated to the supply port 78 by the brake valve 18 is usually much less than full reservoir pressure. In fact, communication of full reservoir pressure would occur only when the brake valve 18 is fully open such as would occur only during a panic stop. Although the pressure level at the supply port 78 tends to force the piston 108 downwardly viewing the FIG. 2, the higher reservoir pressure at control port 86 acts in opposition to the pressure at supply port 78, so that the larger piston 108 remains in the position illustrated in FIG. 2. Accordingly, fluid pressure acting on the smaller surface 114 of the smaller piston 110 causes the latter to move to permit communication to the outlet port 80, but only a portion of the fluid pressure level at the inlet port 78 will be communicated to the outlet port 80, because the pressure at outlet port 80 acts against the larger effective area 112 of the piston 110. Therefore, the forces against the piston 110 will balance when the pressure level at delivery port 80 is less than the pressure level at supply port 78, causing the piston to close. Accordingly, the pressure level at delivery port 80 will be a predetermined fraction of the pressure level at the supply port 78, as is represented by line 0B in FIG. 2.

As discussed above, the pressure at control port 86 is higher than the pressure level at the supply port 78 when a pressure signal is communicated to port 86 of valve 90. The pressure level at supply port 78 acts across the entire area of the piston 108. Accordingly, the pressure at the control port 86 acts across an effective area equal to the area of the piston 108 exposed to the fluid pressure level at inlet 78 less the area of the piston 108 exposed to the vented pressure in the chamber 120. Accordingly, the force due to fluid pressure in the supply port 78 will overcome the force due to fluid pressure in the control port 86 when the pressure in the supply port 78 is still less than the pressure in control port 86. When this occurs, the piston 108 moves into engagement with the piston 110, and thereafter the pistons 108 and 110 act as a single piston. Of course, the area of this single piston exposed to the pressure level in the supply port 78, which is equal to the upper end 124 of the larger piston 108, is greater than the area 112 of the piston 110 exposed to the pressure level at the delivery port 80. Accordingly, only a portion of any subsequent increase of the fluid pressure level at supply port 78 will be communicated to the delivery port 80. The point at which the larger piston 108 moves into engagement with the smaller piston 110 is represented by point B in FIG. 3, and the operation of the valve 76 in which an incremental increase in the pressure level at supply port 78 results in a greater increase of the pressure level at the delivery port 38 is represented by large segment BA in FIG. 3. At supply pressures greater than that represented by point A in FIG. 3, the valve remains fully opened. However, this high pressure, as a practical matter, never occurs when the vehicle is operated without the trailer.

Referring now to FIG. 4, the front proportioning valve 28 is similar in construction and operation to the valve 76 illustrated in FIG. 2. Accordingly, elements of the valve 28 which are the same or similar as are corresponding elements in the valve 76 retain the same reference character, but increased by 100. Referring to FIG. 4, a spring 232 is disposed in a chamber 234 defined within the housing 202 and vented through a vent port 236. The spring 232 urges the larger diameter piston 208 upwardly viewing FIG. 4, into the position illustrated in the drawing. The chamber 238 defined between the lower end viewing FIG. 4 of the larger diameter piston 208 and the surface 240 of the smaller piston 210 is communicated with the control port 98.

In operation, pressure communicated to the control port 98 is communicated into the chamber 238 where it acts upon the surface 240 of the piston 210, forcing the latter downwardly viewing the Figure, to maintain the sealing lip 230 away from the valve element 225. Accordingly, so long as a control pressure is communicated to the control port 98, substantially uninhibited fluid communication is permitted between the supply port 26 and the delivery port 100. This is represented by line 0A in FIG. 3. However, when the control port 98 is vented, the piston 210 can move within the bore 216, so that proportioning action is initiated so that a lower fluid pressure level is established at the deliver port 100 than that communicated to the supply port 26. This operation is represented by line 0B in FIG. 3. When the pressure level at the supply port 26 attains a predetermined level sufficient such that the force due to fluid pressure acting along the larger piston 208 is sufficient to overcome the force exerted on the piston 208 by the spring 232, the piston 208 moves within the housing 202 so that the lower end 222 engages the surface 240 of the piston 210. At higher fluid pressure levels, the pistons 210 and 208 move as a unit. Since the diameter of the unitary piston 208 and piston 210 exposed to the fluid pressure level at the supply port 26 is now larger than the area exposed to the fluid pressure level at the delivery port 100, an incremental increase in the pressure at the supply port 26 will result in a larger increase in the pressure level at the delivery port 100, until the pressures at the supply port 26 and the delivery port 100 are equal. This action of the valve 28 is represented by line BA of FIG. 3. Accordingly, it will be noted that the valves 28 and 76 perform their proportioning functions in a similar manner, the only difference being that the valve 76 proportions when a pressure is communicated to the control port, while the valve 28 proportions only when the control port is vented.

Referring to FIG. 1, assume that the tractor is coupled to a fully ladended trailer. In this situation, the rear wheels of the tractor will bear a substantial portion of the load carried by the trailer, as will the rear wheels of the trailer. Accordingly, it is desirable that the brakes on the trailer and the brakes on the rear wheels of the tractor exert their maximum braking effectiveness. However, the front wheels of the tractor will be relatively unladened. Accordingly, it is desirable to cut down on the braking effectiveness of the tractor front wheel brakes, so that they will not prematurely lock and cause a dangerous skidding condition. On the other hand, if the tractor is pulling an unladened trailer, it is desirable to cut down on the braking effectiveness of the trailer brakes, so that they will not lock and cause a premature skidding condition. Finally, if the tractor is operated without a trailer, weight transfers to the front wheels of the tractor, the rear wheels being relatively unloaded. Accordingly, it is desirable to cut down on the effectiveness of the rear wheel brakes of the tractor so they will not lock, and to increase the effectiveness of the front wheel brakes.

Again referring to FIG. 1, assume that the tractor is pulling a fully ladened trailer. In this situation, the knobs 54 and 56 are manipulated to communicate hold-off pressure to the tractor spring brakes and also to charge the supply line 58 to thereby supply hold-off pressure to the trailer parking brakes. The valve 68 is in a condition such that the delivery port 72 is vented, to thereby vent the control port of the trailer proportioning valve 34. Accordingly, referring to FIGS. 2 and 3, since the control port 33 is vented, the valve 34 permits substantially uninhibited communication during a brake actuation to the service line 62, as represented by line 0A in FIG. 3. Therefore, the full actuating pressure is communicated to the service brake actuating system of the trailer when a brake application is effected. Similarly, as long as the supply line 58 is connected to the trailer, and the valve 54 is opened, a pressure signal will be communicated to the control port 96 of the inversion valve 90. Therefore, the delivery port 88 of the inversion valve 90 will be vented. Therefore, control port 86 of the proportioning valve 76 will also be vented, so that the proportioning valve 76 will permit substantially uninhibited fluid communication between the supply port 78 and the delivery port 80, as described hereinabove and as represented by line segment 0A of FIG. 3.

On the other hand, delivery port 88 of inversion valve 90 is also communicated to the control port 98 of the front axle proportioning valve 28. As also described hereinabove, and referring to FIGS. 3 and 4, the proportioning valve 28 is responsive to pressure at the control port 98 to proportion fluid communication between the supply port 26 and delivery port 100 thereof, as represented by line 0BA of FIG. 3. Accordingly, the pressure communicated to the front wheel brakes will be proportionally less than the pressure communicated to the supply port 26 of the front axle proportioning valve. Therefore, the effectiveness of the front brakes is cut down, since the pressure level communicated thereto is less than the pressure level developed at the brake valve 18. On the other hand, the pressure levels communicated through the proportioning valves 34 and 76 will be the same as that developed at the brake valve 18, since the proportioning valves 34 and 76 are responsive to lack of pressure at their control ports to permit uninhibited fluid communication therethrough.

Assume now that the tractor is pulling a relatively unladened trailer. In this situation, the vehicle operator manipulates the valve knob 70 to cause the valve 68 to move to the condition cutting off communication between the delivery port 72 and the vent and initiating communication between the supply port 66 and the delivery port 72. Accordingly, a pressure signal is communicated to the control port 33 of the proportioning valve 34. When this occurs, the valve 34, during a brake actuation, establishes a predetermined lower pressure level at its delivery port 64 than the pressure level communicated to the supply port 32 thereof. Accordingly, the pressure level communicated to the trailer service brakes during a service brake actuation will be less than the pressure generated at the brake valve 18, so that the trailer brakes will be less effective to prevent brake lock-up and a resultant dangerous skid. Synchronizing valve 40 provides a safety feature in the event that the vehicle operator should forget to return the valve 68 to its condition in which the delivery port 72 thereof is vented when a trailer is again fully ladened. Of course, with a heavily loaded vehicle, higher brake pressures must be achieved in order to gain the desired rate of deceleration. Accordingly, the vehicle operator will reactively increase the pressure level at the brake valve 18 to attain the desired rate of deceleration. Since the delivery port 24 of the brake valve 18 is communicated to the control port 38 of the synchronizing valve 40, the synchronizing valve 40 is responsive to the higher fluid pressure levels which must be generated with a fully ladened vehicle in order to achieve the desired rate of deceleration to open communication between the supply port 36 and the delivery port 42 when this predetermined pressure level is attained. Pressure at the delivery port 42 is communicated to the control port 74 of the valve 68. The valve 68 is responsive to the pressure level at the control port 74 to return to its condition in which the delivery port 72 is vented, thereby venting the control port 33 of the proportioning valve 34 and permitting the latter to return to its condition in which substantially uninhibited fluid communication is permitted between the supply port 32 and the delivery port 64.

Assume now that the trailer is uncoupled from the tractor. In this situation, the supply line 58 and service line 62 are uncoupled from the trailer and the knob 54 must be moved to a position closing off the delivery port 52. Accordingly, the supply line 58 is vented to atmosphere. Therefore, since control port 96 is communicated to the pressure level in supply line 58, the inversion valve 90 communicates the supply port 94 with the delivery port 88, thereby communicating a pressure signal to the control port 86 of the valve 76 and to the control port 98 of the valve 28. Accordingly, as described hereinabove, the valve 76 initiates its proportioning action as represented by line 0BA in FIG. 3, to thereby communicate a pressure level to the control port 82 (and therefore to the rear wheel service brakes) during a brake application which is a predetermined amount less than the pressure level developed at the brake valve 18. On the other hand, the proportioning valve 28 is responsive to the pressure level at control port 98, as also described hereinabove, to discontinue the proportioning action and to permit substantially uninhibited fluid communication between the supply port 26 and delivery port 100 during a brake application. Accordingly, the front wheel brakes are permitted to achieve their full braking effectiveness, while the effectiveness of the trailer rear wheel brakes is cut down by the proportioning action of the proportioning valve 76.

I claim:

1. In a fluid pressure braking system for an articulated vehicle having a towed unit and a towing unit, a source of fluid pressure carried by the towing unit, a supply line interconnecting said units for communicating fluid pressure from the towing unit to the towed unit, a service line interconnecting said units for communicating a service brake actuating signal to the towed unit when a brake application is effected, said towing unit having service brakes and a service brake actuating system controlling said service brakes and the pressure level in said service line when a brake application is effected, characterized in that said service brake actuating system includes proportioning valve means having an oulet connected to said service line, and an inlet communicated to said pressure source when a brake application is effected, said proportioning valve means including operator-activated mechanism shiftable from a first condition in which the proportioning valve means proportions communication between said inlet and outlet to establish a proportionally lower pressure level at the outlet than at the inlet over at least a portion of the range of brake actuating pressures of the service actuating system, said mechanism being shiftable to a second condition permitting substantially uninhibited communication through said proportioning valve means wherein the pressures at the inlet and outlet of the latter are substantially the same throughout the range of brake actuating pressures, said operator-activated mechanism including pressure responsive means responsive to the pressure level in said service brake actuating system to reset said operator-activated mechanism from said first condition to said second condition when the pressure level in said service brake actuating system exceeds a predetermined level.

2. The braking system of claim 1, further characterized in that said proportioning valve means includes valve mechanism having an outlet connected to said service line, an inlet connected to said pressure source, and a control, said valve mechanism being responsive to the pressure level at the control to cause said proportioning of the braking pressure between the inlet and outlet, said operator-actuated mechanism being a manually activated control valve for communicating a control pressure to the control of the valve mechanism.

3. The braking system of claim 2, further characterized in that the manually activated control valve has an outlet port communicated to the control of said valve mechanism, an inlet port communicated to said pressure source and a control port, said manually activated valve means being shiftable from a first position communicating a pressure signal to said control of the valve mechanism to a second position exhausting the control of the valve mechanism, said pressure responsive means generating a pressure signal communicated to said control port causing said manually activated control valve to move from said first position to said second position.

4. The braking system of claim 3, further characterized in that the valve mechanism includes a housing, a differential area piston slidable in said housing having a larger effective area exposed to the fluid pressure level at said outlet port and a smaller effective area exposed to the fluid pressure level at said inlet, and stop means responsive to the pressure level at said control to hold the differential area piston in an open position permitting uninhibited communication between inlet and outlet when a pressure signal is communicated to said control.

5. The braking system of claim 3, further characterized in that said service brake actuating system includes a service brake control valve controlled by the vehicle operator to effect communication between the pressure source and said service brakes and said service line when a brake application is effected, said service brake control valve having at least one inlet port connected to said pressure source and a corresponding outlet port communicated to said service brake actuator and said service line, said pressure responsive means including signal generating valve means responsive to the pressure level at the outlet port of the brake valve to communicate a pressure signal to said control port of said manually activated control valve.

6. The braking system of claim 1, further characterized in that said service brake actuating system includes a service brake control valve actuable by the vehicle operator to effect communication between the pressure source, said service brakes, and said service line when a brake application is effected, said service brake control valve having at least one inlet port connected to said pressure source and a corresponding outlet port communicated to said service line, said pressure responsive means including signal generating valve means responsive to the pressure level at the outlet port of the brake valve to communicate a pressure signal causing said operator actuated mechanism to reset from said first condition to said second condition.

7. The braking system of claim 1, further characterized in that said service brakes on the towing unit include front wheel service brakes and rear wheel service brakes, said service brake actuating system including proportioning mechanism controlling fluid pressure communication to the rear wheel service brakes, said proportioning mechanism being responsive to the pressure level in said supply line to permit substantially uninhibited communication through the proportioning mechanism when the pressure level in the supply line is above a predetermined value and proportioning communication to the rear wheel service brakes when the pressure level in said supply line is below said predetermined value to thereby establish a pressure level in the rear wheel service brakes when a service brake application is effected that is less than the pressure level in said service brake actuating system upstream of said proportioning mechanism over at least a portion of the range of actuating pressures.

8. The braking system of claim 7, further characterized in that said service brake actuating system includes a proportioning device controlling fluid pressure communication to the front wheel service brakes, said proportioning device being responsive to the pressure level in said supply line to permit substantially uninhibited communication through the proportioning device when the pressure level in said supply line is below said predetermined value, said proportioning device being responsive to pressure in said supply line above said predetermined value to proportion fluid communication to the front wheel service brakes to thereby establish a pressure level in the front wheel service brakes that is less than the pressure level in said service brake actuating system upstream of said proportioning device over at least a portion of the range of actuating pressures.

9. The braking system of claim 1, further characterized in that said service brakes on the towing unit include front wheel service brakes and rear wheel service brakes, said service brake actuating system including a proportioning device controlling fluid communication to the front wheel service brakes, said proportioning device being responsive to the pressure level in said supply line to permit substantially uninhibited communication through the proportioning mechanism when the pressure level in the supply line is below a predetermined level and proportioning communication to the front wheel service brakes when the pressure level in said supply line is above said predetermined value to thereby establish a pressure level in the front wheel service brakes when a service brake application is effected that is less than the pressure level in said service brake actuating system upstream of said proportioning device over at least a portion of the range of actuating pressures.

* * * * *